United States Patent
Wang (10) Patent No.: US 10,985,444 B2
(45) Date of Patent: Apr. 20, 2021

(54) ANTENNA MODULE AND TERMINAL

(71) Applicant: BEIJING XIAOMI MOBILE SOFTWARE CO., LTD., Beijing (CN)

(72) Inventor: Yali Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,388

(22) Filed: Nov. 29, 2019

(65) Prior Publication Data
US 2021/0066787 A1 Mar. 4, 2021

(30) Foreign Application Priority Data
Aug. 30, 2019 (CN) .......................... 201910817109.7

(51) Int. Cl.
*H01Q 1/24* (2006.01)
*H01Q 9/04* (2006.01)
*H04M 1/02* (2006.01)

(52) U.S. Cl.
CPC ........... *H01Q 1/243* (2013.01); *H01Q 9/0464* (2013.01); *H04M 1/026* (2013.01)

(58) Field of Classification Search
CPC ........ H01Q 1/243; H01Q 1/01; H01Q 9/0464; H04M 1/026
See application file for complete search history.

(56) References Cited

U.S. PATENT DOCUMENTS

| | | | |
|---|---|---|---|
| 2012/0229348 A1 | 9/2012 | Chiang | |
| 2012/0235879 A1* | 9/2012 | Eder | H01Q 1/38 343/873 |
| 2014/0306848 A1* | 10/2014 | Hong | H01Q 1/243 343/702 |
| 2014/0361929 A1 | 12/2014 | Lin | |
| 2015/0097752 A1* | 4/2015 | Li | H01Q 5/321 343/848 |
| 2015/0123871 A1 | 5/2015 | Chang et al. | |
| 2016/0111786 A1 | 4/2016 | Lilja | |
| 2017/0012339 A1 | 1/2017 | Ito et al. | |

(Continued)

FOREIGN PATENT DOCUMENTS

| | | |
|---|---|---|
| CN | 101997165 A | 3/2011 |
| CN | 101998689 A | 3/2011 |

(Continued)

OTHER PUBLICATIONS

Notice of Allowance in Russian Application No. 2019138731 dated May 25, 2020.

(Continued)

*Primary Examiner* — Md K Talukder
(74) *Attorney, Agent, or Firm* — Syncoda LLC; Feng Ma (57) ABSTRACT

An antenna module includes: a feeding branch, a first branch, a second branch, a third branch and a grounding branch; the feeding branch is connected to a feeding point, and the grounding branch is connected to a grounding point; the first branch and the third branch are concave branches; the second branch is a bent branch; the feeding branch, the first branch, the second branch, the third branch and the grounding branch are connected in sequence to form an annular structure with a slot, the slot is located between the feeding branch and the grounding branch, and the slot is internally insulated.

19 Claims, 6 Drawing Sheets

(56) References Cited

U.S. PATENT DOCUMENTS

| | | | |
|---|---|---|---|
| 2017/0149142 A1* | 5/2017 | Chang | H01Q 5/40 |
| 2017/0244154 A1* | 8/2017 | Chou | H01Q 1/243 |
| 2017/0256854 A1* | 9/2017 | Hu | H01Q 1/243 |

FOREIGN PATENT DOCUMENTS

| | | | |
|---|---|---|---|
| CN | 104716431 | A | 6/2015 |
| EP | 2498336 | A2 | 12/2012 |
| JP | 2004112044 | A | 4/2004 |
| KR | 20020050133 | A | 6/2002 |
| KR | 20090016481 | A | 2/2009 |
| KR | 20110044576 | A | 4/2011 |
| RU | 2627942 | C2 | 8/2017 |
| RU | 2650370 | C1 | 4/2018 |

OTHER PUBLICATIONS

International Search Report of WIPO Application No. PCT/CN2019/111069 dated May 26, 2020.
KR First Office Action in Application No. 10-2019-7033674, dated Sep. 15, 2020.
Extended European Search Report in Application No. 19215574.5, dated Jul. 9, 2020.

* cited by examiner

ANTENNA MODULE AND TERMINAL

CROSS-REFERENCE TO RELATED APPLICATION

This application claims priority to Chinese Patent Application No. 201910817109.7 filed on Aug. 30, 2019, the disclosure of which is hereby incorporated herein by reference in its entirety.

BACKGROUND

With the development of communication technologies, the multi-network era has arrived, with a variety of communication networks such as the 4th generation mobile communication technology (4G), wireless fidelity (WIFI), and the 5th generation mobile communication technology (5G) gradually on the rise. As different communication networks have different frequency bands, a terminal may need to support the frequency bands of multiple communication networks, in order to be compatible with different communication networks and meet the radiation performance requirements of multiple-input multiple-output (MIMO) antennas.

SUMMARY

The present disclosure relates to the field of communication technologies, and in particular, to an antenna module and a terminal.

Various embodiments of the disclosure provides an antenna module and a terminal, which can solve the problem that the antenna module occupies too large space in the related technology. The technical scheme is as follows.

According to a first aspect provided in an embodiment of the present disclosure, there is provided an antenna module, and the antenna module includes a feeding branch, a first branch, a second branch, a third branch and a grounding branch;

the feeding branch is connected to a feeding point, and the grounding branch is connected to a grounding point;

the first branch and the third branch are concave branches;

the second branch is a bent branch;

the feeding branch, the first branch, the second branch, the third branch and the grounding branch are connected in sequence to form an annular structure with a slot;

the slot is located between the feeding branch and the grounding branch, and the slot is internally insulated.

In one implementation, the feeding branch is parallel to the grounding branch.

In another implementation, the feeding branch includes a first feeding portion and a second feeding portion, the first feeding portion is connected to the first branch, and the first feeding portion is connected to the second feeding portion; the first feeding portion and the second feeding portion form an L-shaped branch;

the grounding branch includes a first grounding portion and a second grounding portion, the first grounding portion is connected to the third branch, and the first grounding portion is connected to the second grounding portion; the first grounding portion and the second grounding portion form an L-shaped branch;

the first feeding portion is aligned with the first grounding portion and the second feeding portion is parallel to the second grounding portion.

In another implementation, the first branch includes a first portion, a second portion, and a third portion;

the first portion, the second portion and the third portion are connected in sequence, the first portion and the second portion form an L-shaped branch, and the second portion and the third portion form an L-shaped branch;

the feeding branch is connected to the first portion, and the third portion is connected to the second branch.

In another implementation, the feeding branch includes a first feeding portion and a second feeding portion, the first feeding portion is connected to the first portion of the first branch, and the first feeding portion is connected to the second feeding portion;

the first feeding portion and the second feeding portion form an L-shaped branch;

the first feeding portion and the first portion form an L-shaped branch.

In another implementation, the first portion and the second feeding portion are located on the same side of the first feeding portion, or, the first portion and the second feeding portion are located on two sides of the first feeding portion.

In another implementation, the first portion and the second feeding portion are located on a side of the first feeding portion close to the second branch, or, the first portion and the second feeding portion are located on a side of the first feeding portion away from the second branch.

In another implementation, the third branch includes a fourth portion, a fifth portion and a sixth portion;

the fourth portion, the fifth portion and the sixth portion are connected in sequence, the fourth portion and the fifth portion form an L-shaped branch, and the fifth portion and the sixth portion form an L-shaped branch;

the grounding branch is connected to the fourth portion, and the sixth portion is connected to the second branch.

In another implementation, the grounding branch includes a first grounding portion and a second grounding portion, the first grounding portion is connected to the fourth portion of the third branch, and the first grounding portion is connected to the second grounding portion;

the first grounding portion and the second grounding portion form an L-shaped branch;

the first grounding portion and the fourth portion form an L-shaped branch.

In another implementation, the fourth portion and the second grounding portion are located on the same side of the first grounding portion, or, the fourth portion and the second grounding portion are located on both sides of the first grounding portion.

In another implementation, the fourth portion and the second grounding portion are located on a side of the first grounding portion close to the second branch, or, the fourth portion and the second grounding portion are located on a side of the first grounding portion away from the second branch.

In another implementation, the antenna module is made of an industrial liquid crystal polymer.

According to a second aspect provided by an embodiment of the present disclosure, a terminal is provided, and the terminal includes the antenna module described in the above aspect.

It is to be understood that the above general descriptions and the following detailed descriptions are only exemplary and explanatory and not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the disclosure.

DETAILED DESCRIPTION

In order to make the objects, technical solutions and advantages of the present disclosure more apparent, embodiments of the present disclosure will be described in further detail below with reference to the accompanying drawings.

FIGS. 1 through 6 are schematic structural views illustrating an antenna module according to an exemplary embodiment, and referring to FIGS. 1 to 6, the antenna module includes a feeding branch 1, a first branch 2, a second branch 3, a third branch 4, and a grounding branch 5.

The feeding branch 1 is connected to a feeding point 6, and the grounding branch 5 is connected to a grounding point 7. The first branch 2 and the third branch 4 are concave branches, and the second branch 3 is a bent branch.

An input impedance of an antenna module can be adjusted by adjusting the spacing between the feeding point 6 and the grounding point 7.

The ratio between the output impedance and the input impedance is a standing wave ratio, and the standing wave ratio is used for representing the matching degree of the impedance of a feeder line and the impedance of an antenna. When the standing wave ratio is 1, it means that the impedance of the feeder line and the impedance of the antenna are completely matched, at this moment, high-frequency energy is completely radiated by the antenna, and no reflection loss of the energy exists. When the standing wave ratio is infinite, it means that energy is not radiated at all. Therefore, the standing wave ratio of the antenna module can be adjusted by adjusting the spacing between the feeding point 6 and the grounding point 7.

The feeding branch 1, the first branch 2, the second branch 3, the third branch 4 and the grounding branch 5 are sequentially connected to form an annular structure with a slot, which slot is located between the feeding branch 1 and the grounding branch 5, and which slot is internally insulated. That is, one end of the feeding branch 1 is connected to one end of the first branch 2, the other end of the first branch 2 is connected to one end of the second branch 3, the other end of the second branch 3 is connected to one end of the third branch 4, and the other end of the third branch 4 is connected to one end of the grounding branch 5, so as to form a annular structure with a slot.

Because the slot is internally insulated, the feeding branch 1 and the grounding branch 5 are only turned on by the first branch 2, the second branch 3 and the third branch 4, instead of being turned on by the structure in the slot.

The feeding branch 1, the first branch 2, the second branch 3, the third branch 4 and the grounding branch 5 are sequentially connected to form an inverted F structure. When the lengths, heights, widths and the like of the feeding branch 1, the first branch 2, the second branch 3, the third branch 4 and the grounding branch 5 are adjusted, the intensity of the tuning effect of each branch on the antenna also changes correspondingly.

For example, in the case of the first branch 2 as the wall 1 and the third branch 4 as the wall 2, the lengths of the wall 1 and the wall 2 are adjusted, and when the antenna module operates at 3300 MHz-3800 MHz, the tuning effect of the wall 2 is more obvious than that of the wall 1; the lengths of the wall 1 and the wall 2 are adjusted, and when the antenna module operates at 4400 MHz-5000 MHz, the tuning effect of the wall 1 is more obvious than that of the wall 2.

Wherein the first branch 2 may be located at the left side of the third branch 4, or at the right side of the third branch 4. The feeding branch 1 may be located at the left of the grounding branch 5 or at the right of the grounding branch 5.

Wherein the branches of the antenna module can be connected by soldering or the like, or connected by other connections.

Figure 1:
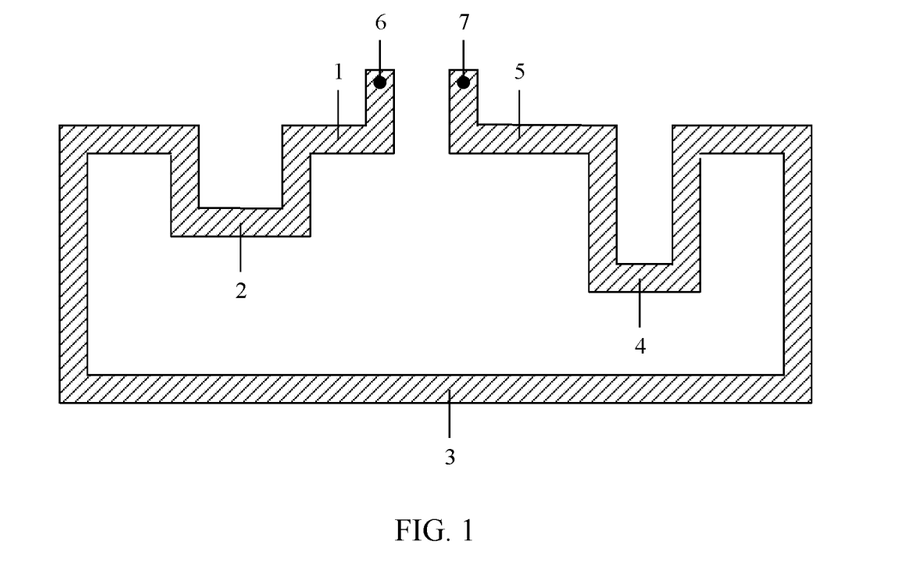
FIG. 1 is a schematic structural view illustrating an antenna module according to an exemplary embodiment.

In one implementation, the feeding branch 1 and the grounding branch 5 are parallel, and a slot is formed between the parallel portions, thereby forming a radiating gap. As shown in FIG. 1, the resonant frequency of the slot antenna can be adjusted by adjusting the spacing between the feeding branch 1 and the grounding branch 5.

In another implementation, the feeding branch 1 includes a first feeding portion and a second feeding portion. The first feeding portion is connected to the first branch 2, and the first feeding portion is connected to the second feeding portion. The first feeding portion and the second feeding portion form an L-shaped branch. The grounding branch 5 includes a first grounding portion and a second grounding portion. The first grounding portion is connected to the third branch 4, and the first grounding portion is connected to the second grounding portion. The first grounding portion and the second grounding portion form an L-shaped branch. The first feeding portion is aligned with the first grounding portion, and the second feeding portion is parallel to the second grounding portion.

In another implementation, the feeding branch 1 is identical to and aligned with the grounding branch 5, the first branch 2 is identical to and aligned with the third branch 4, and the antenna module is in a symmetrical structure about an axis.

The operating frequency band of the antenna module may include: long term evolution (LTE), B5 B8 (824 MHz to 960 MHz), WiFi 2.4G (2400 MHz to 2500 MHz), WiFi 5G (5250 MHz to 5750 MHz), the sub 6th generation mobile communication technology (Sub 6G) N41 (2496 MHz to 2690 MHz), Sub 6G N78 (3300 MHz to 3800 MHz), and Sub 6G N79 (4400 MHz to 5000 MHz).

Wherein the LTE B5 B8 frequency band is generated by a quarter mode of the antenna module wavelength, the WiFi 2.4G frequency band is generated by a one over two mode of the antenna module wavelength, the WiFi 5G frequency band is generated by a seven over two mode of the antenna module wavelength, the Sub 6G N41 frequency band is generated by a one over two mode of the antenna module wavelength, the Sub 6G N78 frequency band is generated by a three over two mode of the antenna module wavelength, and the Sub 6G N79 frequency band is generated by a five over two mode of the antenna module wavelength.

It should be noted that the space, length, height, and width of each part in the antenna module, and the capacitance, inductance, resistance, or other electronic devices, etc. all affect the operating frequency band of the antenna module. The operating frequency bands of different antenna modules are different, so that the antenna module is suitable for different scenes so as to meet the actual requirements.

The antenna module may be made of liquid crystal polymer (LCP), laser direct structuring (LDS), or flexible printed circuit (FPC). In one implementation, the antenna module is made of LCP. Compared with the antenna modules made of LDS and FPC, the antenna module made of LCP is smaller so as to achieve the miniaturization of the antenna. The antenna module made of an LCP material has stronger folding capability, and has more free fitness without limitation to the available space, thereby improving the space utilization rate.

It should be noted that the size of the antenna module is affected by the space environment.

An antenna module is suitable for different terminals, such as a tablet personal computer, a personal computer, an outdoor display, a smart phone and the like. The size of an antenna module is determined by an operating frequency band and a space environment. The space environment refers to the space height, the clearance size, the surrounding metal distance and the like. If the space environment in which the antenna is located is sufficient, the radiation capability of the antenna is stronger.

In the antenna module provided by the embodiment of the disclosure, a feeding branch, a first branch, a second branch, a third branch and a grounding branch form an antenna module with the combination of the slotted annular structure and the inverted F structure. The antenna module can operate at a plurality of frequency bands. The number of the operating frequency bands is increased, and the performance of the antenna module is improved. The radiation performance requirement of a MIMO antenna can be met without arranging a plurality of antenna modules, and the number of the antenna modules is reduced. The occupied space of the antenna module is reduced, i.e., saving space for the other electronic devices in the terminal.

In addition, the slot antenna is formed by slotting between the feeding branch and the grounding branch, and the operating frequency band supported by the antenna module is expanded, that is, the number of operating frequency bands is increased. And the operating frequency band of the antenna module can be adjusted by adjusting the space, length, height and width of each part in the antenna module, and a capacitance, an inductance, a resistance or other electronic devices and the like. The resonant frequency of the slot antenna can be adjusted, for example, by adjusting the spacing between the feeding branch and the grounding branch. Therefore, the structure of the antenna module provided by the embodiment of the disclosure is suitable for various scenes, and the universality and the expansibility thereof are improved.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

In one implementation, referring to FIG. 1, the first branch 2 includes a first portion, a second portion and a third portion. The first portion, the second portion and the third portion are connected in sequence. The first portion and the second portion form an L-shaped branch, and the second portion and the third portion form an L-shaped branch. The first portion is connected to the feeding branch 1, and the third portion is connected to the second branch 3.

In another implementation, the feeding branch 1 includes a first feeding portion and a second feeding portion. The first feeding portion is connected to the second feeding portion. The first feeding portion and the second feeding portion form an L-shaped branch. The first feeding portion is connected to the first portion of the first branch 2, and the first feeding portion and the first portion form an L-shaped branch.

When the first portion and the second feeding portion are located on the same side of the first feeding portion, the first portion and the second feeding portion are located on a side of the first feeding portion close to the second branch 3, or the first portion and the second feeding portion are located on a side of the first feeding portion far from the second branch 3.

When the first portion and the second feeding portion are located on two sides of the first feeding portion, the first portion is located on a side of the first feeding portion close to the second branch 3, and the second feeding portion is located on a side of the first feeding portion away from the second branch 3; or the first portion is located on a side of the first feeding portion away from the second branch 3, and the second feeding portion is located on a side of the first feeding portion close to the second branch 3.

In one implementation, referring to FIG. 1, the third branch 4 includes a fourth portion, a fifth portion, and a sixth portion. The fourth portion, the fifth portion and the sixth portion are connected in sequence. The fourth portion and the fifth portion form an L-shaped branch, and the fifth portion and the sixth portion form an L-shaped branch. The fourth portion is connected to the grounding branch 5, and the sixth portion is connected to the second branch 3.

In another implementation manner, the grounding branch 5 includes a first grounding portion and a second grounding portion. The first grounding portion is connected to the second grounding portion. The first grounding portion and the second grounding portion form an L-shaped branch. The first grounding portion is connected to a fourth portion of the third branch 4. The first grounding portion and the fourth portion form an L-shaped branch.

When the fourth portion and the second grounding portion are located on the same side of the first grounding portion, the fourth portion and the second grounding portion are located on a side of the first grounding portion close to the second branch 3, or the fourth portion and the second grounding portion are located on a side of the first grounding portion far from the second branch 3.

When the fourth portion and the second grounding portion are located on two sides of the first grounding portion, the fourth portion is located on a side of the first grounding portion close to the second branch 3, and the second grounding portion is located on a side of the first grounding portion away from the second branch 3; or the fourth portion is located on a side of the first grounding portion away from the second branch 3, and the second grounding portion is located on a side of the first grounding portion close to the second branch 3.

In the antenna module, the positional relationships between the feeding branch 1, the first branch 2, the second branch 3, the third branch 4, and the grounding branch 5 may include the following cases:

(1) Referring to FIG. 1, the second feeding portion is located on a side of the first feeding portion away from the second branch 3, the first portion is located on a side of the first feeding portion close to the second branch 3, the second grounding portion is located on a side of the first grounding portion away from the second branch 3, and the fourth portion is located on a side of the first grounding portion close to the second branch 3.

Figure 2:
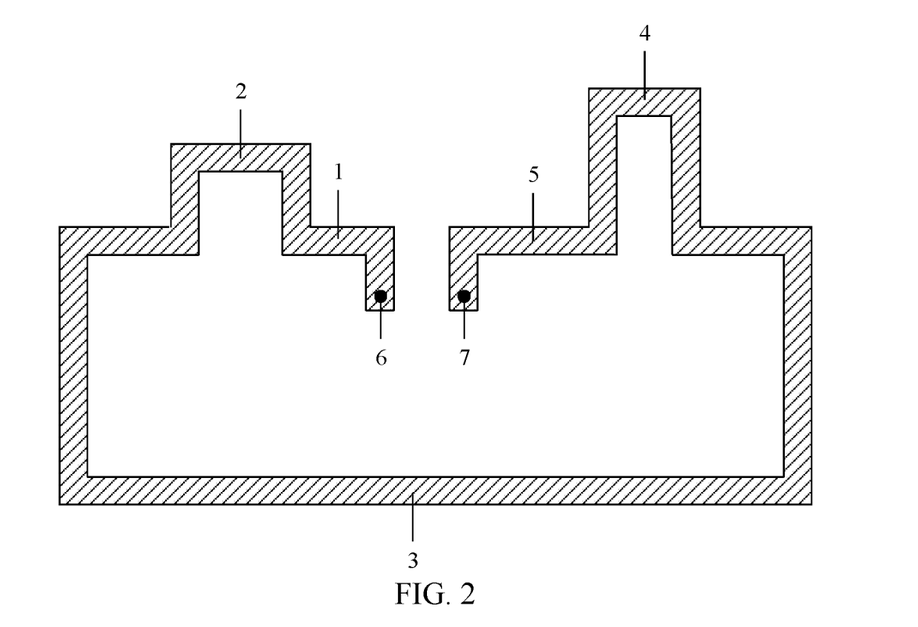
FIG. 2 is a schematic structural view illustrating an antenna module according to an exemplary embodiment.

(2) Referring to FIG. 2, the second feeding portion is located on a side of the first feeding portion close to the second branch 3, the first portion is located on a side of the first feeding portion away from the second branch 3, the second grounding portion is located on a side of the first grounding portion close to the second branch 3, and the fourth portion is located on a side of the first grounding portion away from the second branch 3.

Figure 3:
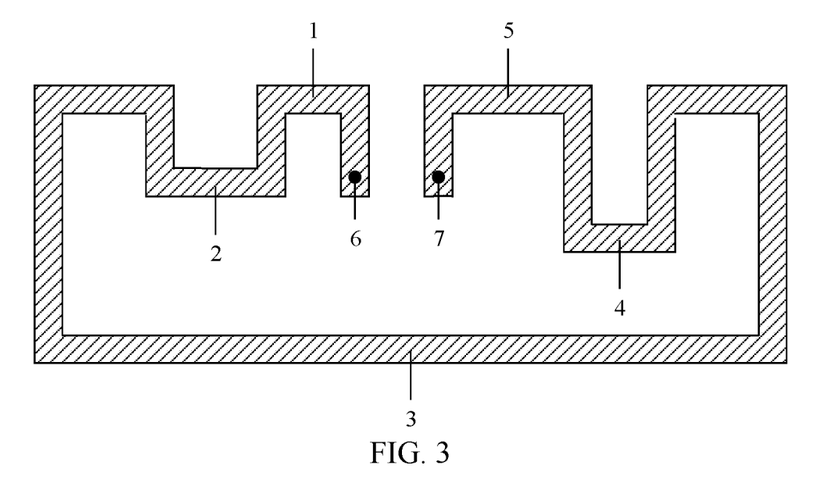
FIG. 3 is a schematic structural view illustrating an antenna module according to an exemplary embodiment.

(3) Referring to FIG. 3, the second feeding portion is located on a side of the first feeding portion close to the second branch 3, the first portion is located on a side of the first feeding portion close to the second branch 3, the second grounding portion is located on a side of the first grounding portion close to the second branch 3, and the fourth portion is located on a side of the first grounding portion close to the second branch 3.

Figure 4:
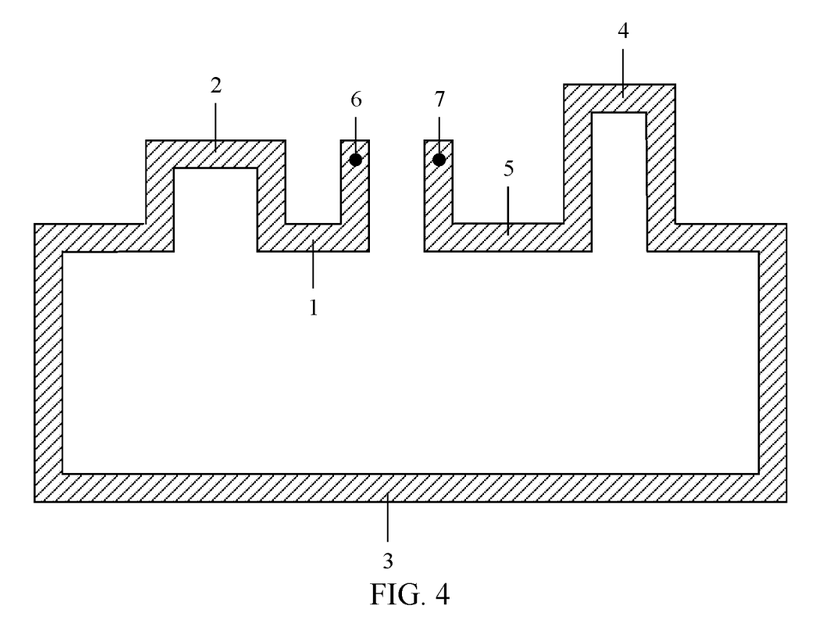
FIG. 4 is a schematic structural view illustrating an antenna module according to an exemplary embodiment.

(4) Referring to FIG. 4, the second feeding portion is located on a side of the first feeding portion away from the second branch 3, the first portion is located on a side of the first feeding portion away from the second branch 3, the second grounding portion is located on a side of the first grounding portion away from the second branch 3, and the fourth portion is located on a side of the first grounding portion away from the second branch 3.

Figure 5:
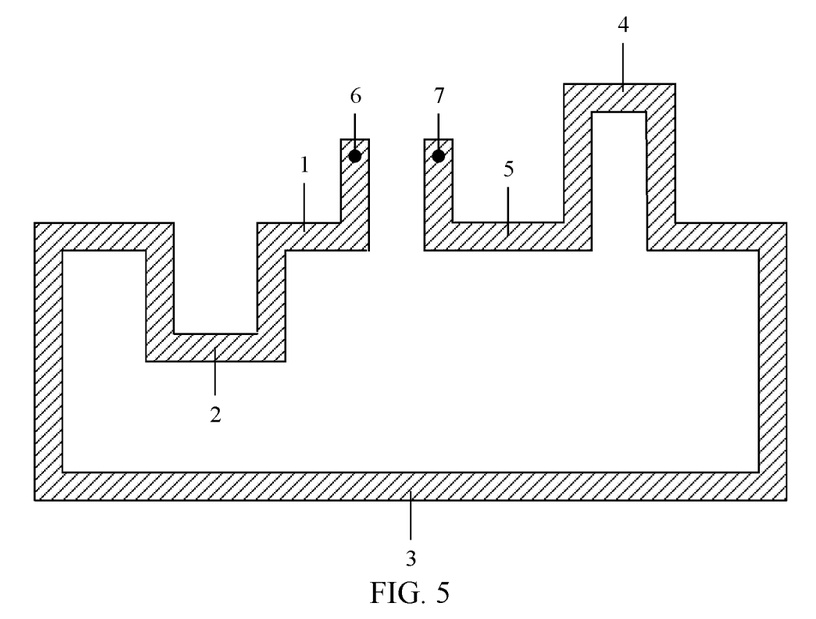
FIG. 5 is a schematic structural view illustrating an antenna module according to an exemplary embodiment.

(5) Referring to FIG. 5, the second feeding portion is located on a side of the first feeding portion away from the second branch 3, the first portion is located on a side of the first feeding portion close to the second branch 3, the second grounding portion is located on a side of the first grounding portion away from the second branch 3, and the fourth portion is located on a side of the first grounding portion away from the second branch 3.

Figure 6:
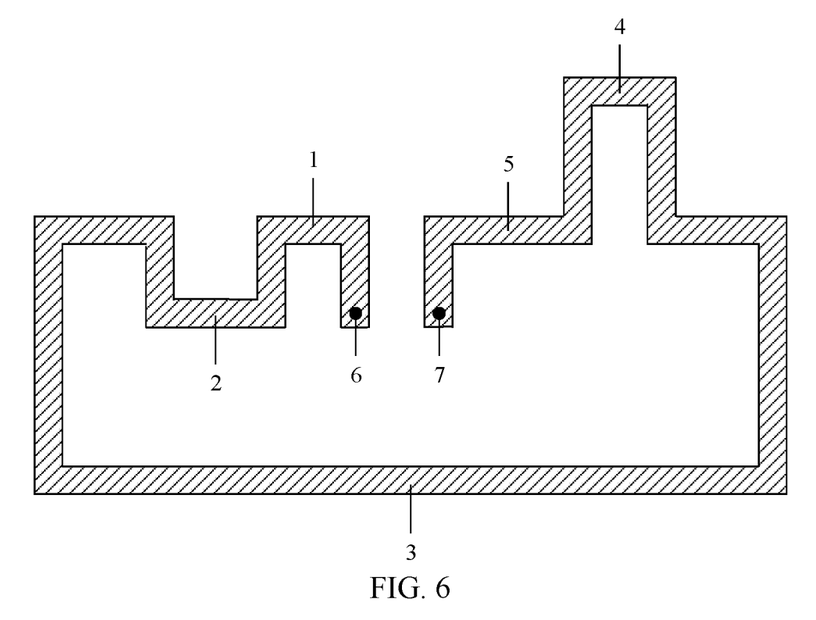
FIG. 6 is a schematic structural view illustrating an antenna module according to an exemplary embodiment.

(6) Referring to FIG. 6, the second feeding portion is located on a side of the first feeding portion close to the second branch 3, the first portion is located on a side of the first feeding portion close to the second branch 3, the second grounding portion is located on a side of the first grounding portion close to the second branch 3, and the fourth portion is located on a side of the first grounding portion far from the second branch 3.

According to the antenna module provided by the embodiment of the disclosure, the slot between the first portion and the third portion in the first branch and the slot between the fourth portion and the sixth portion in the third branch form the slot antenna, so that the operating frequency bands supported by the antenna module are expanded, that is, the number of the operating frequency bands is increased. And the operating frequency band of the slot antenna can be adjusted by adjusting the spacing between the first portion and the third portion and the spacing between the fourth portion and the sixth portion. Therefore, the structure of the antenna module provided by the embodiment of the disclosure is suitable for various scenes, and the universality and the expansibility thereof are improved.

Figure 7:
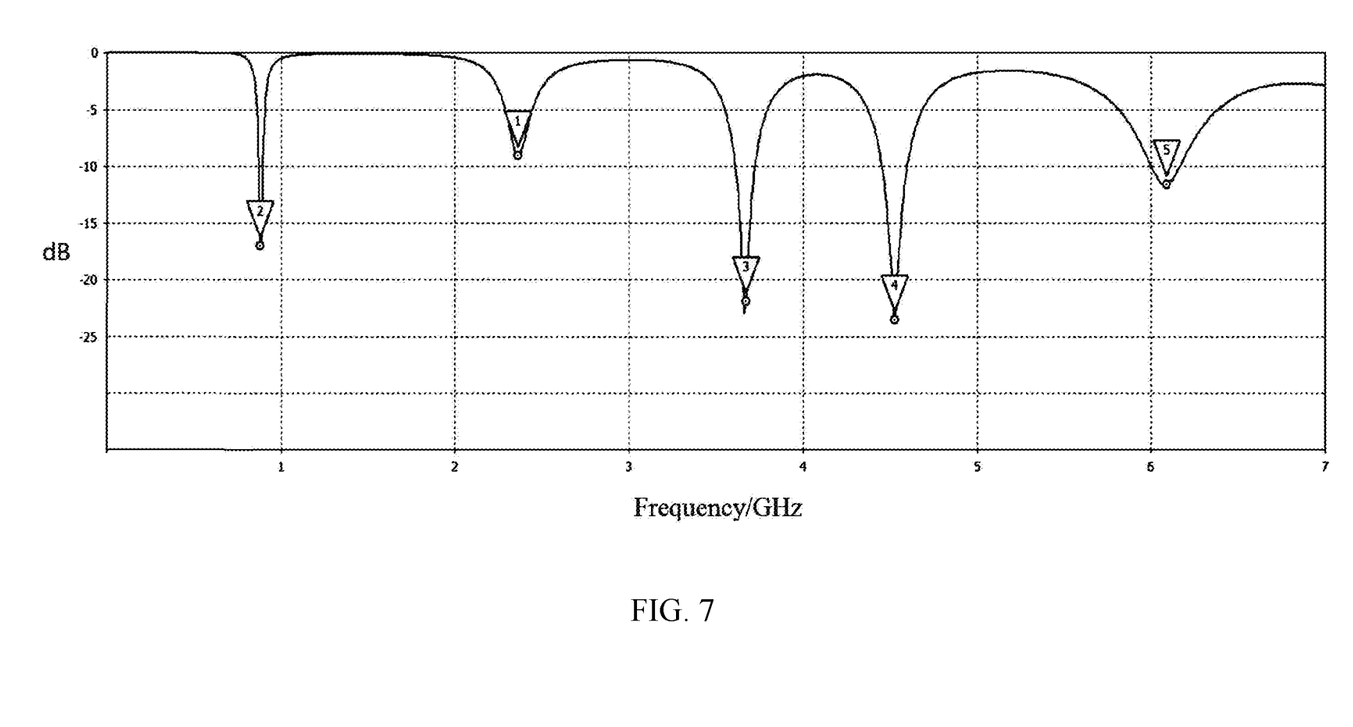
FIG. 7 is a schematic diagram illustrating return loss of an antenna module according to an exemplary embodiment.
Figure 8:
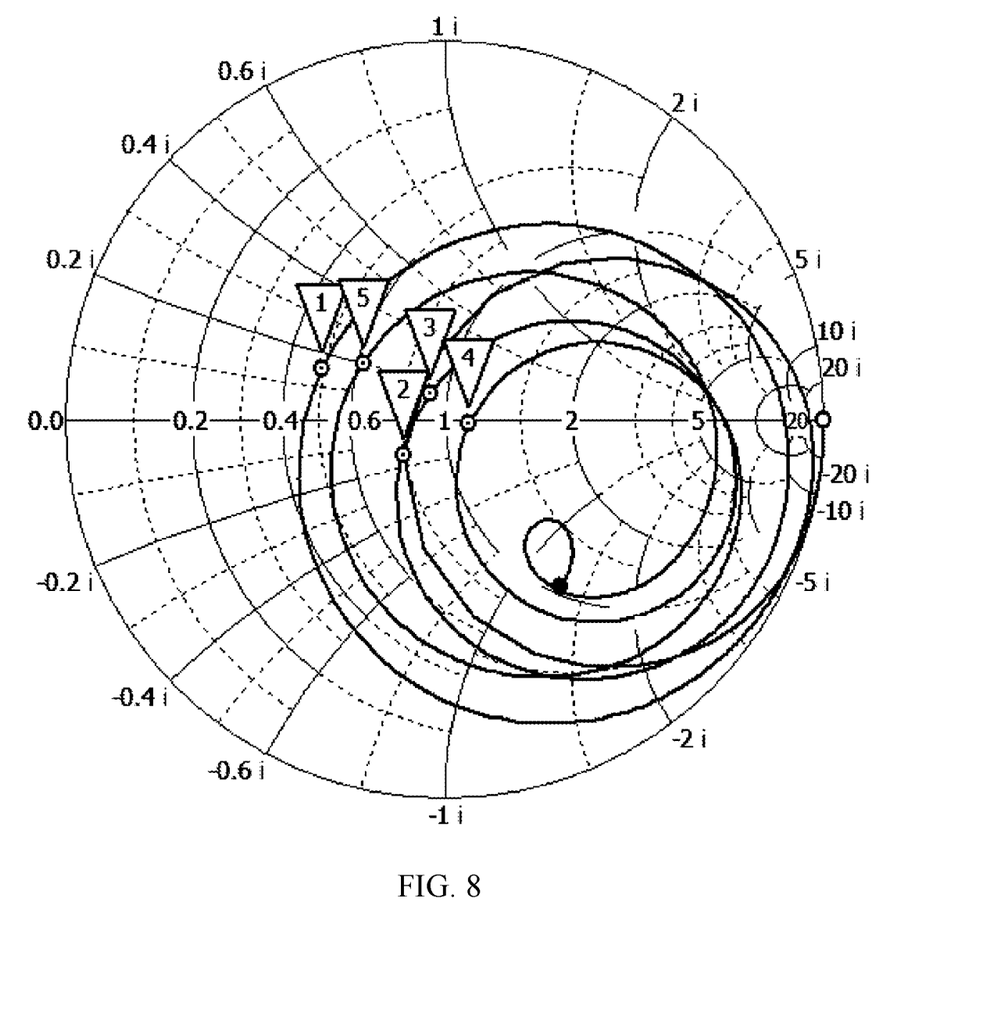
FIG. 8 is an impedance chart illustrating an exemplary embodiment.

FIG. 7 is a schematic diagram of the return loss of the antenna module according to the above embodiment, wherein the abscissa is frequency, and the ordinate is return loss. FIG. 7 provides five resonance points generated by the antenna module, and the impedance chart shown in FIG. 8 shows the corresponding relationship between the normalized impedance and the reflection coefficient when the five resonance points shown in FIG. 7 operate.

The resonance point 1 corresponds to a frequency of 2.36 gigahertz (GHz) and a return loss of 9.1047 decibel (dB); the resonance point 2 corresponds to a frequency of 0.88 GHz, and the return loss is 17.038 dB; the resonance point 3 corresponds to a frequency of 3.672 GHz, and the return loss is 21.914 dB; the resonance point 4 corresponds to a frequency of 4.5285 GHz, and the return loss is 23.575 dB; the resonance point 5 corresponds to a frequency of 6.088 GHz and a return loss of 11.627 dB.

The embodiment of the present disclosure further provides a terminal, which terminal includes an antenna module related to the above embodiments, and includes all structures and functions of the antenna module, which are not described in detail herein.

Figure 9:
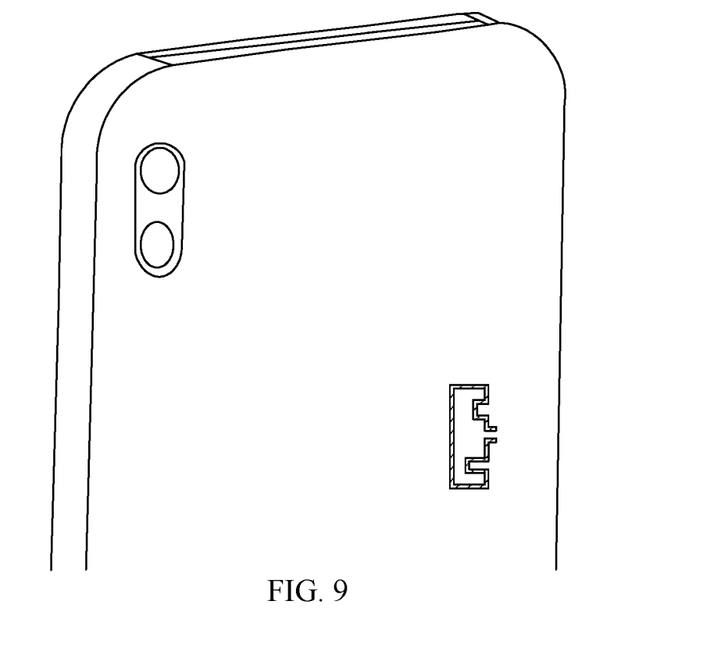
FIG. 9 is a schematic diagram illustrating the location of an antenna module according to an exemplary embodiment.

The position of the antenna module on the terminal may include the following cases:

(1) Referring to FIG. 9, the terminal includes a rear cover, and the antenna module is located at an inner side of the rear cover. The rear cover can be made of a metal or nonmetal material, and the nonmetal material can be a plastic material, a glass material or other material. The upper area of the antenna module is made of a nonmetal material.

When the antenna module of the embodiment of the disclosure is arranged on the inner side of the rear cover, other antenna modules arranged on the terminal cannot be influenced, and the operability is improved.

Figure 10:
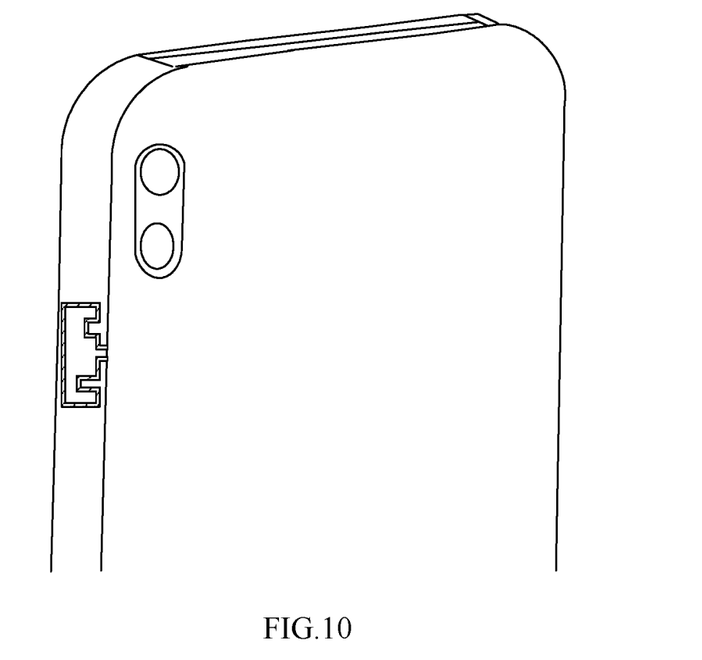
FIG. 10 is a schematic diagram illustrating the location of an antenna module according to an exemplary embodiment.

(2) Referring to FIG. 10, the terminal includes a frame. The antenna module may be located on the frame, and the frame on which the antenna module is located may be made of a non-metal material.

Various embodiments of the disclosure can have one or more of the following advantages:

In the antenna module and the terminal provided by the embodiment of the disclosure, a feeding branch, a first branch, a second branch, a third branch and a grounding branch form an antenna module with the combination of an annular structure and an inverted F structure. The antenna module can operate at a plurality of frequency bands. The number of the operating frequency bands is increased, and the performance of the antenna module is improved. The radiation performance requirement of a MIMO antenna can be met without arranging a plurality of antenna modules, and the number of the antenna modules is reduced. The occupied space of the antenna module is reduced, i.e., saving space for the other electronic devices in the terminal.

In addition, the slot antenna is formed by slotting between the feeding branch and the grounding branch, between the first portion and the third portion, and between the fourth portion and the sixth portion, and the operating frequency band supported by the antenna module is expanded, that is, the number of operating frequency bands is increased. And the operating frequency band of the antenna module can be adjusted by adjusting the space, length, height and width of each part in the antenna module, and a capacitance, an inductance, a resistance or other electronic devices and the like. The resonant frequency of the slot antenna can be adjusted, for example, by adjusting the spacing between the feeding branch and the grounding branch. Therefore, the structure of the antenna module provided by the embodiment of the disclosure is suitable for various scenes, and the universality and the expansibility thereof are improved.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:
1. An antenna module, wherein
the antenna module comprises: a feeding branch, a first branch, a second branch, a third branch and a grounding branch;

the feeding branch is connected to a feeding point, and the grounding branch is connected to a grounding point;

the first branch and the third branch are concave branches;

the second branch is a bent branch;

the feeding branch, the first branch, the second branch, the third branch and the grounding branch are connected in sequence to form an annular structure with a slot;

the slot is located between the feeding branch and the grounding branch, and the slot is internally insulated;

the feeding branch comprises a first feeding portion and a second feeding portion, the first feeding portion is connected to the first branch, and the first feeding portion is connected to the second feeding portion; the first feeding portion and the second feeding portion form an L-shaped branch;

the grounding branch comprises a first grounding portion and a second grounding portion, the first grounding portion is connected to the third branch, and the first grounding portion is connected to the second grounding portion; the first grounding portion and the second grounding portion form an L-shaped branch; and the first feeding portion is aligned with the first grounding portion and the second feeding portion is parallel to the second grounding portion.

2. The antenna module according to claim 1, wherein the feeding branch is parallel to the grounding branch.

3. The antenna module according to claim 1, wherein the first branch comprises a first portion, a second portion, and a third portion;

the first portion, the second portion and the third portion are connected in sequence, the first portion and the second portion form an L-shaped branch, and the second portion and the third portion form an L-shaped branch;

the feeding branch is connected to the first portion, and the third portion is connected to the second branch.

4. The antenna module according to claim 3, wherein the feeding branch comprises a first feeding portion and a second feeding portion, the first feeding portion is connected to the first portion of the first branch, and the first feeding portion is connected to the second feeding portion;

the first feeding portion and the second feeding portion form an L-shaped branch;

the first feeding portion and the first portion form an L-shaped branch.

5. The antenna module according to claim 4, wherein the first portion and the second feeding portion are located on the same side of the first feeding portion, or, the first portion and the second feeding portion are located on two sides of the first feeding portion.

6. The antenna module according to claim 5, wherein the first portion and the second feeding portion are located on a side of the first feeding portion close to the second branch, or, the first portion and the second feeding portion are located on a side of the first feeding portion away from the second branch.

7. The antenna module according to claim 1, wherein the third branch comprises a fourth portion, a fifth portion and a sixth portion;

the fourth portion, the fifth portion and the sixth portion are connected in sequence, the fourth portion and the fifth portion form an L-shaped branch, and the fifth portion and the sixth portion form an L-shaped branch;

the grounding branch is connected to the fourth portion, and the sixth portion is connected to the second branch.

8. The antenna module according to claim 1, wherein the antenna module is made of an industrial liquid crystal polymer.

9. A mobile phone comprising the antenna module of claim 1, wherein the antenna module has a combination of an annular structure and an inverted F structure.

10. The mobile phone of claim 9, wherein the mobile phone is configured to meet performances requirement of a multiple-input multiple-output (MIMO) antenna without arranging a plurality of antenna modules.

11. An antenna module, wherein the antenna module comprises: a feeding branch, a first branch, a second branch, a third branch and a grounding branch;

the feeding branch is connected to a feeding point, and the grounding branch is connected to a grounding point;

the first branch and the third branch are concave branches;

the second branch is a bent branch;

the feeding branch, the first branch, the second branch, the third branch and the grounding branch are connected in sequence to form an annular structure with a slot;

the slot is located between the feeding branch and the grounding branch, and the slot is internally insulated;

the third branch comprises a fourth portion, a fifth portion and a sixth portion;

the fourth portion, the fifth portion and the sixth portion are connected in sequence, the fourth portion and the fifth portion form an L-shaped branch, and the fifth portion and the sixth portion form an L-shaped branch;

the grounding branch is connected to the fourth portion, and the sixth portion is connected to the second branch;

the grounding branch comprises a first grounding portion and a second grounding portion, the first grounding portion is connected to the fourth portion of the third branch, and the first grounding portion is connected to the second grounding portion;

the first grounding portion and the second grounding portion form an L-shaped branch;

the first grounding portion and the fourth portion form an L-shaped branch.

12. The antenna module according to claim 11, wherein the fourth portion and the second grounding portion are located on the same side of the first grounding portion, or, the fourth portion and the second grounding portion are located on both sides of the first grounding portion.

13. The antenna module according to claim 12, wherein the fourth portion and the second grounding portion are located on a side of the first grounding portion close to the second branch, or, the fourth portion and the second grounding portion are located on a side of the first grounding portion away from the second branch.

14. A terminal, wherein the terminal comprises an antenna module, the antenna module comprises: a feeding branch, a first branch, a second branch, a third branch and a grounding branch;

the feeding branch is connected to a feeding point, and the grounding branch is connected to a grounding point;

the first branch and the third branch are concave branches;

the second branch is a bent branch;

the feeding branch, the first branch, the second branch, the third branch and the grounding branch are connected in sequence to form an annular structure with a slot;

the slot is located between the feeding branch and the grounding branch, and the slot is internally insulated;

the feeding branch comprises a first feeding portion and a second feeding portion, the first feeding portion is connected to the first branch, and the first feeding portion is connected to the second feeding portion; the first feeding portion and the second feeding portion form an L-shaped branch;

the grounding branch comprises a first grounding portion and a second grounding portion, the first grounding portion is connected to the third branch, and the first grounding portion is connected to the second grounding portion; the first grounding portion and the second grounding portion form an L-shaped branch;

the first feeding portion is aligned with the first grounding portion and the second feeding portion is parallel to the second grounding portion.

15. A mobile phone comprising an antenna module, wherein the antenna module comprises: a feeding branch, a first branch, a second branch, a third branch and a grounding branch;

the feeding branch is connected to a feeding point, and the grounding branch is connected to a grounding point;

the first branch and the third branch are concave branches;

the second branch is a bent branch;

the feeding branch, the first branch, the second branch, the third branch and the grounding branch are connected in sequence to form an annular structure with a slot;

the slot is located between the feeding branch and the grounding branch, and the slot is internally insulated;

the antenna module has a combination of an annular structure and an inverted F structure;

the mobile phone is configured to meet performances requirement of a multiple-input multiple-output (MIMO) antenna without arranging a plurality of antenna modules; and the first branch comprises a first portion, a second portion, and a third portion; the third branch comprises a fourth portion, a fifth portion and a sixth portion;

the antenna module comprises a slot antenna formed by slotting between the feeding branch and the grounding branch, between the first portion and the third portion, and between the fourth portion and the sixth portion, to thereby increase number of operating frequency bands.

16. The mobile phone of claim 15, wherein the operating frequency band of the antenna module is adjustable by adjusting space, length, height and width of components of the antenna module.

17. The mobile phone of claim 16, wherein the operating frequency band of the antenna module is further adjustable by adjusting a capacitance, an inductance, or a of the components of the antenna module.

18. The mobile phone of claim 17, wherein a resonant frequency of the slot antenna is adjustable by adjusting the spacing between the feeding branch and the grounding branch.

19. The mobile phone of claim 18, further comprising a display screen.

* * * * *